US012463380B2

(12) United States Patent
Cavallieri et al.

(10) Patent No.: US 12,463,380 B2
(45) Date of Patent: Nov. 4, 2025

(54) HEADER POWER CONNECTOR

(71) Applicants: TE CONNECTIVITY BRASIL INDUSTRIA DE ELECTRONICOS LTDA, Braganca Paulista (BR); TE Connectivity Solutions GmbH, Schaffhausen (CH)

(72) Inventors: Amadeu Luiz Fazani Cavallieri, Sao Paulo (BR); David James Rhein, Riley, MI (US)

(73) Assignees: TE Conectivity Braasil Industria De Electronicos Ltda; TE Connectivity Solutions GmbH

( * ) Notice: Subject to any disclaimer, the term of this patent is extended or adjusted under 35 U.S.C. 154(b) by 371 days.

(21) Appl. No.: 18/082,704

(22) Filed: Dec. 16, 2022

(65) Prior Publication Data

US 2024/0204455 A1 Jun. 20, 2024

(51) Int. Cl.

| | |
|---|---|
| ***H01R 13/629*** | (2006.01) |
| ***H01R 13/05*** | (2006.01) |
| ***H01R 13/502*** | (2006.01) |
| ***H01R 13/631*** | (2006.01) |
| ***H01R 13/639*** | (2006.01) |

(52) U.S. Cl.

CPC ..... *H01R 13/62922* (2013.01); *H01R 13/057* (2013.01); *H01R 13/502* (2013.01); *H01R 13/631* (2013.01); *H01R 13/639* (2013.01)

(58) Field of Classification Search

CPC ............ H01R 13/62922; H01R 13/057; H01R 13/502; H01R 13/631; H01R 13/639

USPC .......................................................... 439/157

See application file for complete search history.

(56) References Cited

U.S. PATENT DOCUMENTS

| | | | | |
|---|---|---|---|---|
| 4,212,510 A * | 7/1980 | Ritchie .............. | H01R 13/7197 333/183 |
| 4,296,390 A * | 10/1981 | Vanderheyden ....... | H01R 13/66 333/182 |
| 5,630,734 A * | 5/1997 | Phillips, Jr. .......... | H01R 13/719 333/182 |
| 6,743,052 B1 * | 6/2004 | Lin ...................... | H01R 31/065 439/620.15 |
| 2015/0288094 A1 * | 10/2015 | Lerner ................. | H01R 13/005 156/60 |

* cited by examiner

*Primary Examiner* — Gary F Paumen

(57) ABSTRACT

A header power connector includes a header housing assembly including an outer housing having an outer wall forming a cavity configured to receive upper and lower busbars. The header housing assembly includes an inner housing received in the cavity having a terminal channel holding a terminal assembly including a plurality of terminals arranged in a terminal stack. Each terminal includes upper and lower sockets at upper and lower mating ends configured to receive the upper and lower busbars, respectively. The header power connector includes a choke received in the cavity having a chock body with an opening therethrough receiving the terminal assembly. The header power connector includes a choke positioner in the cavity interfacing with the choke to position the choke relative to the outer housing.

20 Claims, 10 Drawing Sheets

HEADER POWER CONNECTOR

BACKGROUND OF THE INVENTION

The subject matter herein relates generally to header power connectors.

Power connectors are used to transfer power between electrical components. For example, in an electric vehicle, a power connector is used to electrically connect an inverter with an electric motor. Typically, the power is supplied by coupling a cable mounted plug connector to a header power connector. The plug connector may be manipulated and moved into position for mating with the header power connector. The plug connector increases overall cost of the system being an extra component extending between the electrical components. There is a desire to directly couple the electrical components to the header power connector, such as to eliminate the plug connector and thus reduce the number of components and the cost of the system. However, alignment of the electrical components with the header power connector is difficult and may lead to improper mating and damage to the components.

Additionally, interference between the components, such as electromagnetic interference (EMI) is problematic in the header power connector. Adding filters, such as a choke, to the header power connector may reduce EMI. However, the choke may cause damage to the header power connector over time, such as due to movement of the choke within the header power connector from vibration which may damage the terminals, the busbars, the housing, or other components of the header power connector.

A need remains for a header power connector having improved mating tolerances.

BRIEF DESCRIPTION OF THE INVENTION

In one embodiment, a header power connector is provided and includes a header housing assembly including an outer housing having an outer wall forming a cavity. The outer housing extends between a top and a bottom. The outer housing configured to receive an upper busbar in the cavity through the top. The outer housing configured to receive a lower busbar in the cavity through the bottom. The header housing assembly includes an inner housing received in the cavity. The inner housing includes a terminal channel. The header power connector includes a terminal assembly held in the terminal channel of the inner housing. The terminal assembly received in the cavity. The terminal assembly includes a plurality of terminals arranged in a terminal stack. Each terminal includes an upper mating end has an upper socket configured to receive the upper busbar and a lower mating end has a lower socket configured to receive the lower busbar. The terminals configured to electrically connect the upper and lower busbars. The header power connector includes a choke received in the cavity. The choke has a chock body surrounding the terminal assembly. The choke body has an opening therethrough receiving the terminal assembly. The header power connector includes a choke positioner in the cavity. The choke positioner interfaces with the choke to position the choke relative to the outer housing.

In another embodiment, a header power connector is provided and includes a header housing assembly including an outer housing having an outer wall forming a cavity. The outer housing extends between a top and a bottom. The outer housing has a first side and a second side. The outer housing has a front and a rear. The outer housing configured to receive an upper busbar in the cavity through the top. The outer housing configured to receive a lower busbar in the cavity through the bottom. The header housing assembly includes an inner housing received in the cavity. The inner housing includes a terminal channel. The header power connector includes a terminal assembly held in the terminal channel of the inner housing. The terminal assembly received in the cavity. The terminal assembly includes a plurality of terminals arranged in a terminal stack. Each terminal includes an upper mating end has an upper socket configured to receive the upper busbar and a lower mating end has a lower socket configured to receive the lower busbar. The terminals configured to electrically connect the upper and lower busbars. The header power connector includes a choke received in the cavity. The choke has a chock body surrounding the terminal assembly. The choke body has an opening therethrough receiving the terminal assembly. The header power connector includes a horizontal choke positioner in the cavity. The choke positioner interfaces with the choke to horizontally position the choke relative to the outer housing between the first side and the second side. The header power connector includes a vertical choke positioner in the cavity. The choke positioner interfaces with the choke to vertically position the choke relative to the outer housing between the top and the bottom.

In a further embodiment, a power connector system is provided and includes an upper busbar for powering a first electrical component. The upper busbar has an upper busbar edge. The power connector system includes a lower busbar for powering a second electrical component. The lower busbar has a lower busbar edge. The power connector system includes a header power connector for electrically connecting the upper busbar with the lower busbar to transfer power between the first and second electrical components. The header power connector includes a header housing assembly including an outer housing having an outer wall forming a cavity. The outer housing extends between a top and a bottom. The outer housing receiving the upper busbar in the cavity through the top. The outer housing receiving the lower busbar in the cavity through the bottom. The header housing assembly includes an inner housing received in the cavity. The inner housing includes a terminal channel. The header power connector includes a terminal assembly held in the terminal channel of the inner housing. The terminal assembly received in the cavity. The terminal assembly includes a plurality of terminals arranged in a terminal stack. Each terminal includes an upper mating end has an upper socket configured to receive the upper busbar and a lower mating end has a lower socket configured to receive the lower busbar. The terminals configured to electrically connect the upper and lower busbars. The header power connector includes a choke received in the cavity. The choke has a chock body surrounding the terminal assembly. The choke body has an opening therethrough receiving the terminal assembly. The header power connector includes a choke positioner in the cavity. The choke positioner interfaces with the choke to position the choke relative to the outer housing.

DETAILED DESCRIPTION OF THE INVENTION

Figure 1:
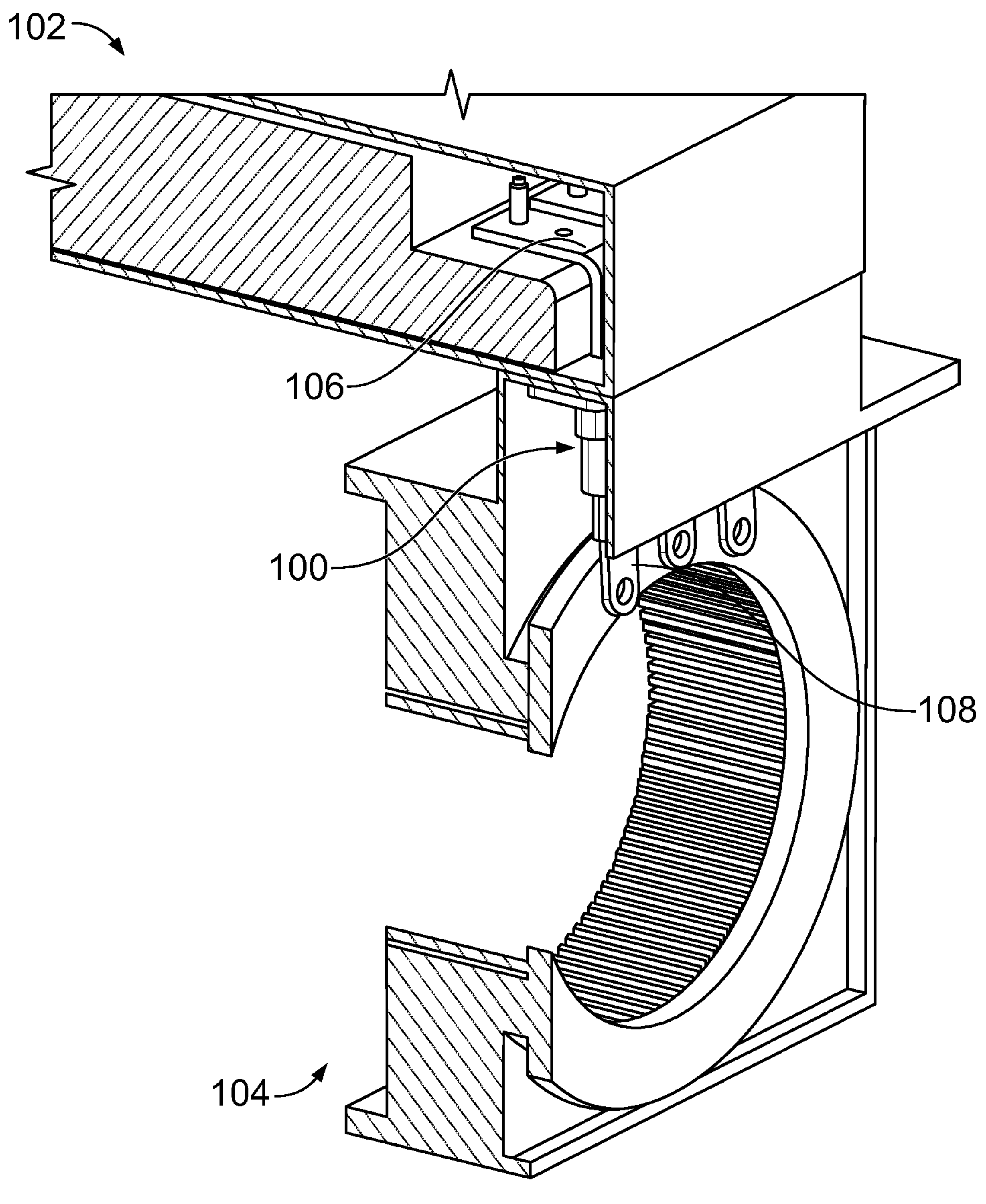
FIG. 1 is a schematic view of a header power connector in accordance with an exemplary embodiment.

FIG. 1 is a schematic view of a header power connector 100 in accordance with an exemplary embodiment. The header power connector 100 is used to electrically connect a first electrical component 102 and a second electrical component 104. In various embodiments, the first and second electrical components 102, 104 may be part of an electric vehicle. For example, the first electrical component 102 may be an inverter and the second electrical component 104 may be an electric motor. The header power connector 100 may be used to electrically connect other types of electrical components in alternative embodiments. In an exemplary embodiment, the header power connector 100 is mounted to the first electrical component 102 and mated with the second electrical component 104 when the first electrical component 102 is coupled to the second electrical component 104.

In an exemplary embodiment, the first electrical component 102 includes a first busbar 106 and the second electrical component 104 includes a second busbar 108. The first and second busbars 106, 108 are configured to be plugged directly into opposite ends of the header power connector 100. The header power connector 100 electrically connects the first and second busbars 106, 108 to transmit power between the first and second electrical components 102, 104.

Figure 2:
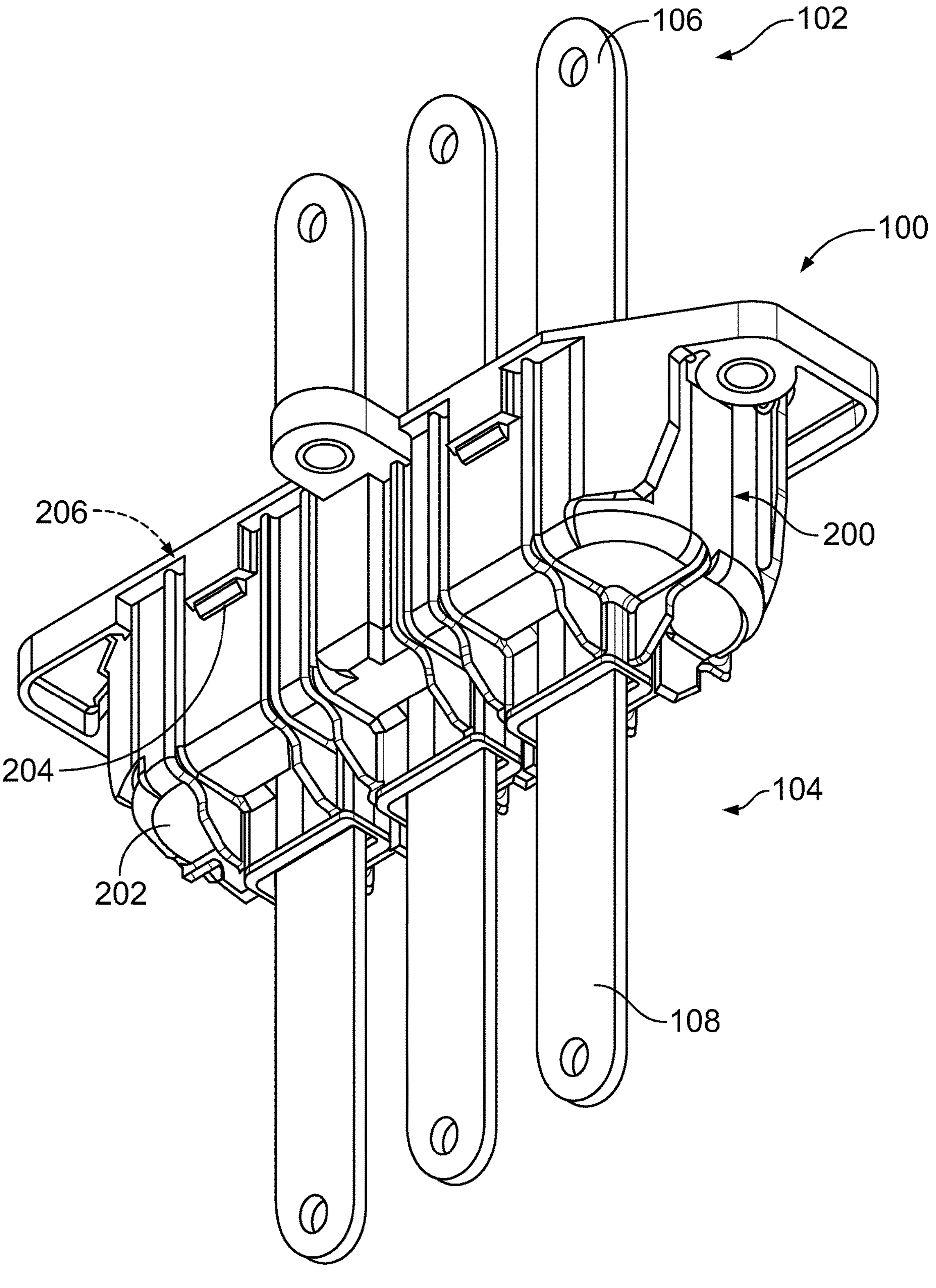
FIG. 2 is a perspective view of the header power connector in accordance with an exemplary embodiment.

FIG. 2 is a perspective view of the header power connector 100 in accordance with an exemplary embodiment. FIG. 2 illustrates portions of the first and second electrical components 102, 104. FIG. 2 illustrates the first and second busbars 106, 108. In an exemplary embodiment, the header power connector 100 is used to electrically connect a plurality of the first busbars 106 (for example, three busbars) with a corresponding plurality of the second busbars 108 (for example, three busbars). The first busbars 106 are metal plates, such as copper plates. The second busbars 108 are metal plates, such as copper plates.

The header power connector 100 is located between the first electrical component 102 and the second electrical component 104. The busbars 106 of the first electrical component 102 are configured to be plugged directly into the header power connector 100. The busbars 108 of the second electrical component 104 are configured to be plugged directly into the header power connector 100, such as an opposite end of the header power connector 100. Optionally, the header power connector 100 may be initially mounted to the first electrical component 102 (or the second electrical component 104) and mated to the second electrical component 104 (or the first electrical component 102) when the first electrical component 102 is mounted to the second electrical component 104.

The header power connector 100 includes a header housing assembly 200 and one or more terminal assemblies held by the header housing assembly 200. In an exemplary embodiment, the header housing assembly 200 is a multipiece housing assembly. For example, the header housing assembly 200 includes an outer housing 202 and an inner housing 204. The inner housing 204 holds the terminal assemblies. The inner housing 204 is received in a cavity 206 of the outer housing 202. In an exemplary embodiment, the outer housing 202 is configured to be mounted to one of the electrical components, such as the first electrical component 102. In an exemplary embodiment, the inner housing 204 is movable relative to the outer housing 202 to accommodate alignment and mating with the first electrical component 102. For example, the inner housing 204 may be tilted or rotated within the outer housing 202 to accommodate misalignment of the first and second busbars 106, 108. The inner housing 204 has a limited amount of contained movement relative to the outer housing 202. The outer housing 202 is shaped to control and contained the movement of the inner housing 204 during mating. For example, the outer housing 202 may allow the inner housing 204 to rotate a predetermined amount to allow mating with the busbars 106 of the first electrical component 102 during mating therewith. In an exemplary embodiment, the terminals of the terminal assemblies also have a limited amount of contained movement relative to the inner housing 204 to accommodate the misalignment of the first and second busbars 106, 108 during mating.

Figure 3:
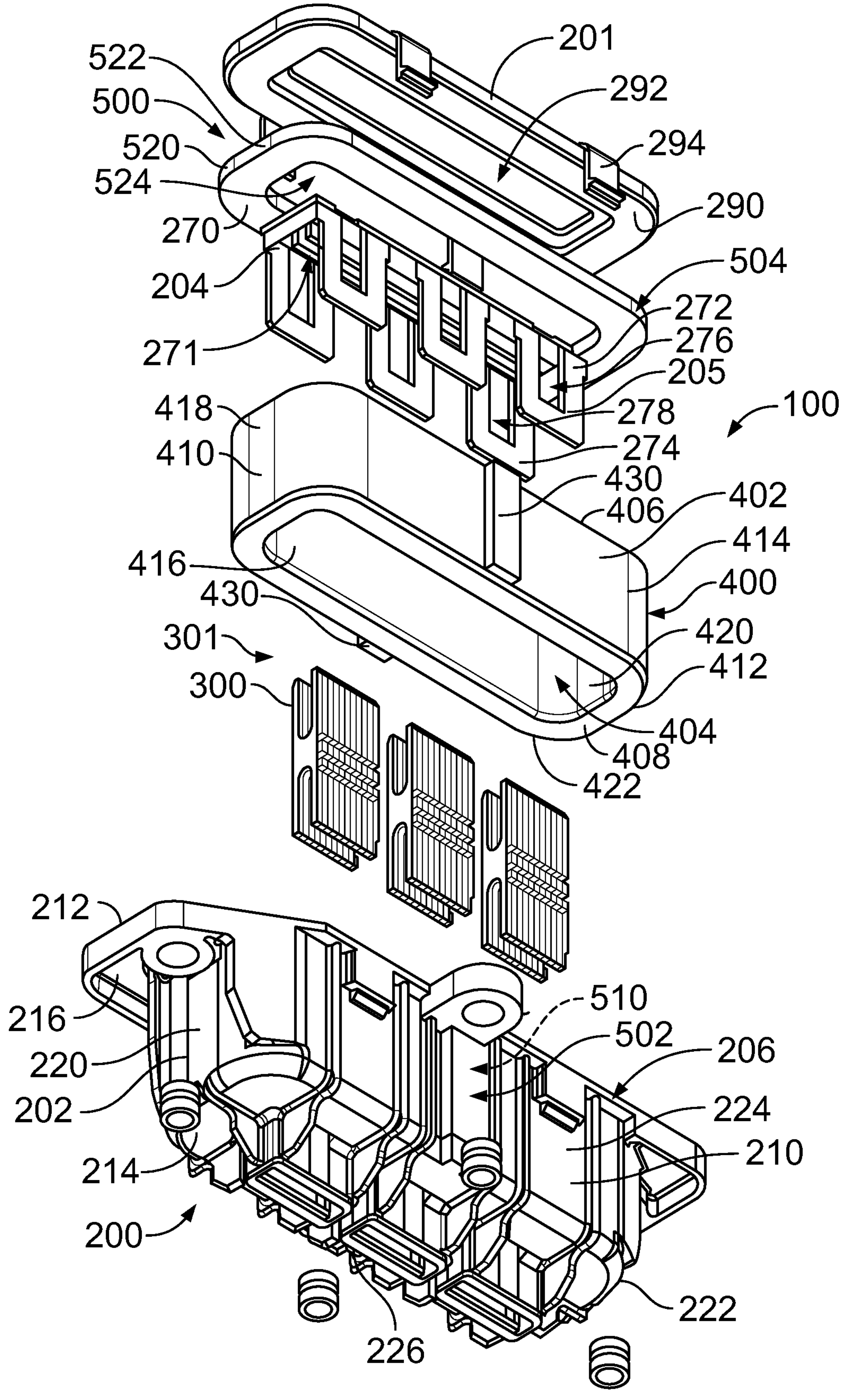
FIG. 3 is an exploded view of the header power connector in accordance with an exemplary embodiment.

FIG. 3 is an exploded view of the header power connector 100 in accordance with an exemplary embodiment. The header power connector 100 includes the header housing assembly 200, a plurality of the terminal assemblies 301 held by the header housing assembly 200, a choke 400 held by the header housing assembly 200, and a choke positioner 500 for positioning the choke 400 in the header housing assembly 200. The choke 400 surrounds the terminal assemblies 301 to cancel EMI for high frequency electronic noise suppression for the terminal assemblies 301. The choke 400 improves operation of the header power connector 100.

In an exemplary embodiment, the header housing assembly 200 includes the outer housing 202, the inner housing 204, and a cover 201 coupled to the outer housing 202 to hold the other components in the outer housing 202. In an exemplary embodiment, the inner housing 204 includes a terminal assembly retainer 205 configured to be coupled to the outer housing 202. The header housing assembly 200 may include greater or fewer parts in alternative embodiments. For example, the inner housing 204 may include a terminal holder, which may be located within the cavity of the outer housing 202. Additionally, while the parts are shown as separate, discrete components in the illustrated embodiment, various parts may be integrated into integral structures in alternative embodiments. For example, the terminal holder may be an integral, unitary structure with the outer housing 202 in alternative embodiments.

The outer housing 202 includes an outer wall 210 surrounding the cavity 206. The outer wall 210 extends between an upper end 212 and a lower end 214 of the outer housing 202. In an exemplary embodiment, the upper end 212 is configured to be mounted to the first electrical component 102 such that the header power connector 100 extends from the bottom of the first electrical connector 102. Other mounting orientations are possible in alternative embodiments. For example, the header power connector 100 may be oriented such that the end 212 defines a bottom of the outer housing 202, such as when the outer housing 202 is mounted to the top of the structure, such as one of the electrical components. In other various embodiments, the outer housing 202 may be oriented such that neither of the ends 212, 214 are at the top or the bottom, but rather define sides of the outer housing 202. The terms upper and lower are used herein in reference to the orientation illustrated in the figures.

The outer housing 202 includes mounting flanges 216 at opposite sides 220, 222 of the outer housing 202. The mounting flanges 216 may receive fasteners to secure the outer housing 202 to the first electrical component 102. The outer housing 202 includes a front 224 and a rear 226 extending between the sides 220, 222. The cavity 206 is formed between the front 224 and the rear 226. The cavity 206 extends between the first side 220 and the second side 222. The cavity 206 is open to receive the inner housing 204, the terminal assemblies 301, the choke 400 and the choke positioner 500.

The outer housing 202 may include latching features (not shown) used to secure the inner housing 204 to the outer housing 202. The latching features may be deflectable latching tabs configured to engage corresponding latching features of the inner housing 204. The latching features may be releasable to release the inner housing 204 from the outer housing 202.

The outer housing 202 may include walls or other features that form terminal channels configured to receive corresponding terminal assemblies 301 therein. The terminal channels may be open at an upper end and a lower end to receive the busbars 106, 108, respectively. The walls guide the busbars 106, 108 into the terminal channels to mate with the terminal assemblies 301. Optionally, the walls may include chamfered lead-in surfaces that guide the busbars 106, 108 into the terminal channels.

The terminal assembly retainer 205 includes an end wall 270 and side walls 272, 274 extending from the end wall 270. The end wall 270 includes slots 271 configured to receive the busbars 106. The side walls 272, 274 include openings 276, 278 that receive latching features to secure the terminal assembly retainer 205 to the outer housing 202. The side walls 272, 274 may be latchably coupled to the latching features. The side walls 272, 274 may be releasable from the latching features.

The cover 201 is configured to be coupled to the outer housing 202 after the other components are assembled in the cavity 206. The cover 201 is used to retain the components in the cavity 206. For example, the cover 201 may be used to retain the inner housing 204 and terminal assemblies 301 in the cavity 206. The cover 201 is used to retain the choke 400 and the choke positioner 500 in the cavity 206.

The cover 201 includes a cover plate 290 used to cover the upper opening of the outer housing 202. In an exemplary embodiment, the cover 201 includes an opening 292 to receive the busbars 106. However, the cover 201 may include a plurality of openings in alternative embodiments each configured to receive a corresponding busbar 106. The cover 201 may be removably coupled to the outer housing 202. For example, the cover 201 includes latches 294 extending from the cover plate 290 configured to be latchably coupled to the outer housing 202.

The choke 400 is configured to be received in the cavity 206 of the outer housing 202 in a loading direction (for example, vertically). The choke 400 is configured to surround the terminal assemblies 301 when received in the cavity 206. The choke 400 includes a choke body 402 surrounding an opening 404 passing through the choke 400. The choke body 402 may be manufactured from a ferrite material, such as a magnesium zinc alloy material or an iron nickel alloy material. The choke body 402 may be manufactured form a material having characteristics of high permeability of the magnetic core and/or high saturation level and/or low magnetic losses. In the illustrated embodiment, the choke 400 is oval or racetrack shaped having curved ends and flat or parallel sides. The choke 400 may have other shapes in alternative embodiments.

The choke 400 extends between a top 406 and a bottom 408. The opening 404 extends between the top 406 and the bottom 408. The opening 404 is open at the top 406 and is open at the bottom 408 to receive terminal assemblies 301 and the busbars 106, 108. The choke 400 includes a first side 410 and a second side 412 opposite the first side 410. The choke 400 includes a front 414 and a rear 416 extending between the sides 410, 412. Rounded corners may be provided between the sides 410, 412 and the front 414 and the rear 416. The front 414 and the rear 416 may be elongated and oriented parallel to each other. The choke 400 includes a side wall 418 between the top 406 and the bottom 408. The side wall 418 is outward facing. The side wall 418 is defined by the front 414, the rear 416, and the sides 410, 412.

The choke 400 includes an inner surface 420 and an outer surface 422. The inner surface 420 surrounds and defines the opening 404. The inner surface 420 is configured to face the inner housing 204. The outer surface 422 faces outward. The outer surface 422 is configured to face the outer wall 210 of the outer housing 202.

In an exemplary embodiment, the choke 400 includes locating ribs 430 extending from the front 414 and/or the rear 416. The locating ribs 430 protrude from the choke 400. The locating ribs 430 are located along the outer surface 422 in the illustrated embodiment. However, the locating ribs 430 may extend along the inner surface 420 in alternative embodiments. The locating ribs 430 are used for positioning the choke 400 within the cavity 206. The locating ribs 430 interface with the choke positioner 500 to position the choke 400 relative to the outer housing 202. In other embodiments, the locating ribs 430 may additionally or alternatively be provided along the first side 410 and/or the second side 412. Other types of locating features may be used in alternative embodiments. For example, the locating features may be channels or slots rather than protrusions in alternative embodiments. In other various embodiments, the locating features may be deflectable beams, such as spring beams in alternative embodiments.

The choke positioner 500 is configured to interface with the choke 400 to position the choke 400 relative to the terminal assemblies 301. In an exemplary embodiment, multiple choke positioners 500 are provided for positioning the choke 400 in different directions. For example, the header power connector 100 may include at least one horizontal choke positioners 510 and at least one vertical choke positioners 520. The vertical choke positioners 520 position the choke in a direction parallel to the loading direction. The horizontal choke positioners 510 position the choke 400 in a lateral direction perpendicular to the loading direction.

The horizontal choke positioners 510 position the choke 400 in a horizontal direction, such as side-to-side and/or front-to-rear. In the illustrated embodiment, the horizontal choke positioners 502 include channels 512 in the outer housing 202. The channels 512 extend along an inner surface of the outer wall 210. The channels 512 are open to the cavity 206. The channels 512 receive the locating ribs 430. The channels 512 may be located along the front 224 and/or the rear 226. The channels 512 may be located along the first side 220 and/or the second side 222. Other types of horizontal choke positioners 510 may be used in alternative embodiments. The horizontal choke positioners 510 may include ribs or protrusions extending from the outer wall 210, which are configured to be received in pockets or slots in the choke 400. The horizontal choke positioners 510 may additionally or alternatively be provided on the terminal holder 203 and/or the terminal assembly retainer 205. The horizontal choke positioners 510 may include biasing elements, such as spring fingers to engage and position the choke 400. The horizontal choke positioners 510 may include compressible gaskets or sleeves configured to engage the choke 400.

The vertical choke positioner 520 positions the choke 400 vertically, such as top-to-bottom. In the illustrated embodiment, the vertical choke positioner 520 includes a compression ring 522. The compression ring 522 is configured to be coupled to the top 406 and/or the bottom 408. The compression ring 522 may be received in the outer housing 202, such as at the bottom of the cavity 206 and the choke 400 may rest on the compression ring 522. The compression ring 522 may be loaded into the cavity 206 after the choke 400 and fill the space between the choke 400 and the cover 201. The compression ring 522 includes an opening 524 therethrough to receive the busbars 106 or 108. The compression ring 522 is compressible, such as being compressible between the choke 400 and the header housing assembly 200. The compression ring 522 absorbs movement of the choke 400 in the cavity 206. The compression ring 522 restricts or limits movement of the choke 400 in a vertical direction, such as due to vibration or shock of the header power connector 100 during use, such as when the electric vehicle is driven. Other types of vertical choke positioners 504 may be used in alternative embodiments, such as locating ribs, clips, latches, or other locating features.

In the illustrated embodiment, a plurality of the terminal assemblies 301 are provided. Each terminal assembly 301 includes a plurality of terminals 300 stacked together in a terminal stack. The terminals 300 are arranged side-by-side in the terminal stack. The terminals 300 function as a single terminal assembly within the terminal stack. However, the terminals 300 are independently movable relative to each other and relative to the inner housing 204. The terminals 300 may be stamped and formed from thin metal sheets, but stacked together to increase the overall current carrying capacity of the terminal assembly. The terminal stacks are configured to be received in the outer housing 202, such as in the corresponding terminal channel, and are held in the outer housing 202 by the terminal assembly retainer 205. The inner housing 204 holds the terminals 300 from below, from the sides, from the front, and from the rear, while the terminal assembly retainer 205 holds the terminals 300 from above enclosing the terminal channels 256. The choke 400 surrounds the terminal stacks, such as being located in the cavity 206 between the inner housing 204 and the outer housing 202.

Figure 4:
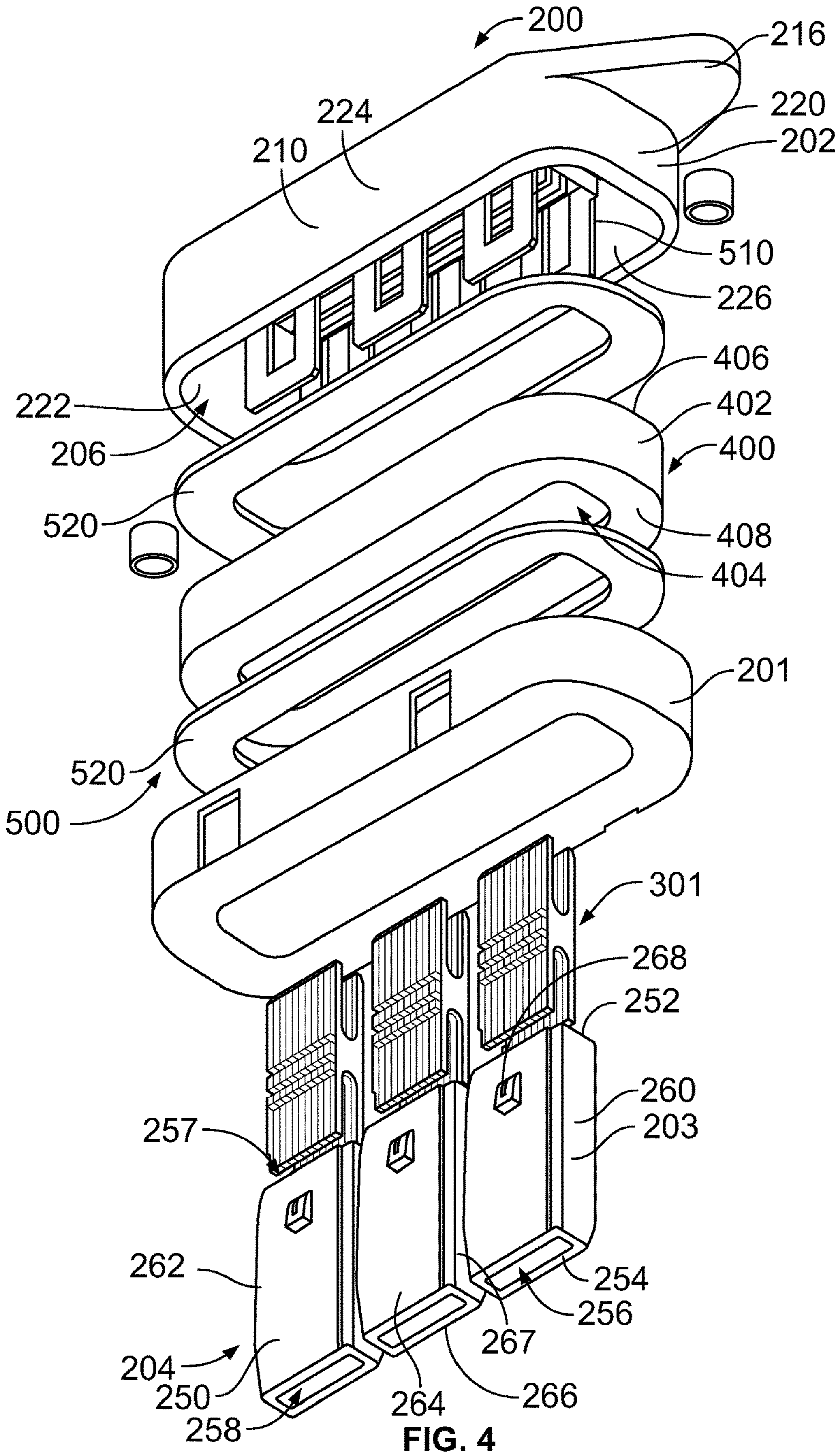
FIG. 4 is an exploded view of a header power connector in accordance with an exemplary embodiment.

FIG. 4 is an exploded view of the header power connector 100 in accordance with an exemplary embodiment. The header power connector 100 shown in FIG. 4 is similar to the header power connector 100 shown in FIG. 3 but includes different holding structures for holding the terminal assemblies 301. For example, the inner housing 204 is shaped differently and/or includes different components. The header power connector 100 includes the header housing assembly 200, the terminal assemblies 301 held by the header housing assembly 200, the choke 400 held by the header housing assembly 200, and the choke positioner 500 for positioning the choke 400 in the header housing assembly 200. The choke 400 surrounds the terminal assemblies 301 to cancel EMI for high frequency electronic noise suppression for the terminal assemblies 301. The choke 400 improves operation of the header power connector 100.

In an exemplary embodiment, the header housing assembly 200 includes the outer housing 202, the inner housing 204, and the cover 201 coupled to the outer housing 202 to hold the other components in the outer housing 202. In an exemplary embodiment, the inner housing 204 includes a terminal holder 203. The header housing assembly 200 may include greater or fewer parts in alternative embodiments. Additionally, while the parts are shown as separate, discrete components in the illustrated embodiment, various parts may be integrated into integral structures in alternative embodiments. For example, the terminal holder 203 may be an integral, unitary structure with the outer housing 202 in alternative embodiments.

The outer housing 202 includes the outer wall 210 surrounding the cavity 206. The outer housing 202 includes the mounting flanges 216 at the opposite sides 220, 222 of the outer housing 202 to secure the outer housing 202 to the first electrical component 102. The cavity 206 is formed between the front 224 and the rear 226 of the outer housing 202 and between the first side 220 and the second side 222 of the outer housing 202. The cavity 206 is open to receive the inner housing 204, the terminal assemblies 301, the choke 400 and the choke positioner 500.

The outer housing 202 may include latching features (not shown) used to secure the inner housing 204 to the outer housing 202. The latching features may be deflectable latching tabs configured to engage corresponding latching features of the inner housing 204. The latching features may be releasable to release the inner housing 204 from the outer housing 202.

The terminal holder 203 of the inner housing 204 includes a plurality of inner walls 250 extending between an upper end 252 and a lower end 254. The inner walls 250 form terminal channels 256 configured to receive corresponding terminal assemblies 301 therein. The terminal channels 256 are open at the upper end 252 and the lower end 254 to receive the busbars 106, 108, respectively. For example, the terminal holder 203 includes upper openings 257 that receive the first busbars 106 and lower openings 258 that receive the second busbars 108. The inner walls 250 guide the busbars 106, 108 into the terminal channels 256 to mate with the terminal assemblies 301. Optionally, the upper openings 257 and/or the lower openings 258 may include chamfered lead-in surfaces that guide the busbars 106, 108 into the terminal channels 256.

The terminal holder 203 of the inner housing 204 includes a first side 260 and a second side 262 opposite the first side 260. The terminal holder 203 of the inner housing 204 includes a front 264 and a rear 266 extending between the sides 260, 262. In an exemplary embodiment, the terminal holder 203 of the inner housing 204 includes positioning ribs 267 extending from the front 264 and/or the rear 266. The positioning ribs 267 are configured to position the inner housing 204 relative to the outer housing 202.

In an exemplary embodiment, the terminal holder 203 of the inner housing 204 includes latching features 268 extending from the front 264 and/or the rear 266. The latching features 268 are configured to interface with the outer housing 202 to secure the terminal holder 203 in the cavity 206 of the outer housing 202. In the illustrated embodiment, the latching features 268 include latches each having a ramp surface at the top of the latch and a catch surface at the bottom of the latch. Other types of latching features may be provided in alternative embodiments.

The cover 201 is configured to be coupled to the outer housing 202 after the other components are assembled in the cavity 206. The cover 201 is used to retain the components in the cavity 206. For example, the cover 201 may be used to retain the inner housing 204 and terminal assemblies 301 in the cavity 206. The cover 201 is used to retain the choke 400 and the choke positioner 500 in the cavity 206.

The choke 400 is configured to be received in the cavity 206 of the outer housing 202 in a loading direction (for example, vertically). The choke 400 is configured to surround the terminal assemblies 301 when received in the cavity 206. The choke 400 includes the choke body 402 surrounding the opening 404, which is open at the top 406 and is open at the bottom 408 to receive terminal assemblies 301 and the busbars 106, 108.

The choke positioner 500 is configured to interface with the choke 400 to position the choke 400 relative to the terminal assemblies 301. In an exemplary embodiment, multiple choke positioners 500 are provided for positioning the choke 400 in different directions. For example, the header power connector 100 may include at least one horizontal choke positioners 510 and at least one vertical choke positioners 520. The vertical choke positioners 520 may be compressible gaskets stacked above and below the choke 400. The vertical choke positioners 520 position the choke in a direction parallel to the loading direction. The horizontal choke positioners 510 are positioning tabs located within the cavity of the outer housing 202 in the illustrated embodiment. The horizontal choke positioners 510 position the choke 400 in a lateral direction perpendicular to the loading direction.

Figure 5:
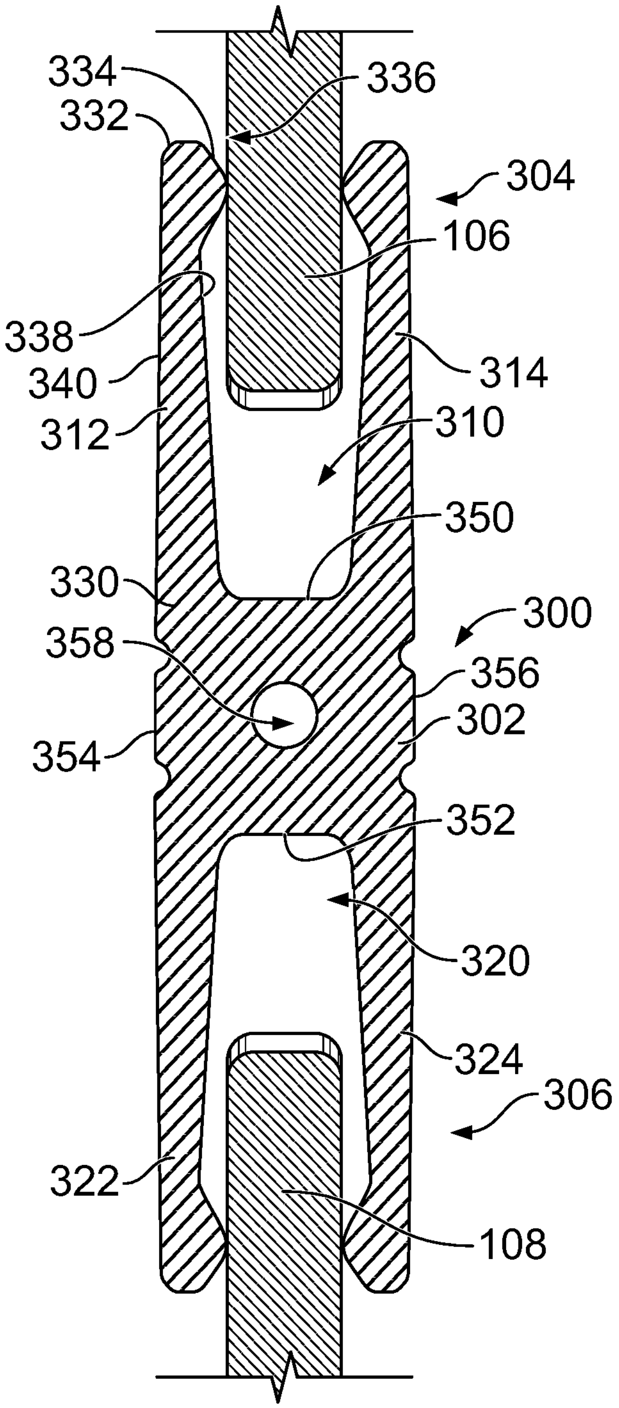
FIG. 5 is a side view of one of the terminals in accordance with an exemplary embodiment.

FIG. 5 is a side view of one of the terminals 300 in accordance with an exemplary embodiment. The terminal 300 is a double ended socket terminal configured to receive the first and second busbars 106, 108 in opposite ends of the terminal 300. Other types of terminals may be used in alternative embodiments.

The terminal 300 is a stamped and formed terminal manufactured from a metal material, such as a copper material. The terminal 300 may have one or more plating layers, such as a nickel plating layer and/or a gold plating layer. The terminal 300 includes a terminal base 302, an upper mating end 304 at a first side of the terminal base 302, and a lower mating end 306 at a second side of the terminal base 302. Optionally, the upper mating end 304 and the lower mating end 306 may be identical.

The terminal 300 has an upper socket 310 at the upper mating end 304. The terminal 300 includes a first upper spring beam 312 extending along the first side of the upper socket 310 and a second upper spring beam 314 extending along the second side of the upper socket 310.

The terminal includes a lower socket 320 at the lower mating end 306. The terminal 300 includes a first lower spring beam 322 extending along the first side of the lower socket 320 and a second lower spring beam 324 extending along the second side of the lower socket 310.

In an exemplary embodiment, the spring beams 312, 314, 322, 324 may be identical to one another. The spring beams 312, 314, 322, 324 may be deflectable when mated to the corresponding busbars 106 or 108. For example, the spring beams 312, 314, 322, 324 may be deflected outward when mated to the busbar 106 or 108, thus creating an inward biasing force or spring force to maintain electrical contact between the spring beams 312, 314, 322, 324 and the busbars 106 or 108.

In an exemplary embodiment, each spring beam 312, 314, 322, 324 includes a base 330 and a tip 332 at the distal end of the spring beam. The base 330 extends from the terminal base 302. Optionally, the spring beam 312, 314, 322, 324 may be widest at the base 330. In an exemplary embodiment, the spring beam 312, 314, 322, 324 narrows from the base 330 toward the tip 332. In an exemplary embodiment, the spring beam includes a bulge 334 near the tip 332. Optionally, the bulge 334 may be bulged inward. The bulge 334 has a curved surface defining a mating interface 336 configured to be mated with the corresponding busbar 106 or 108. The spring beam 312, 314, 322, 324 includes an inner surface 338 and an outer surface 340 opposite the inner surface 338. In various embodiments, the inner surface 338 and the outer surface 340 are tapered inward from the base 330 toward the tip 332. Optionally, the inner surface 338 may be tapered inward at a greater angle than the outer surface 340.

The terminal base 302 is located generally at the central portion of the terminal 300, such as between the upper mating end 304 and the lower mating end 306. The terminal base 302 includes an upper end 350 and a lower end 352. The terminal base 302 includes a first side 354 and a second side 356. The upper spring beams 312, 314 extend from the upper end 350 at the first and second sides 354, 356, respectively. The lower spring beams 322, 324 extend from the lower end 352 at the first and second sides 354, 356, respectively. In an exemplary embodiment, the terminal base 302 includes an opening 358 therethrough. Optionally, the opening 358 may be approximately centered between the upper end 350 and the lower end 352 and may be approximately centered between the first side 354 and the second side 356. The opening 358 may receive a portion of the header housing assembly 200 to locate and or retain the terminal 300 in the header housing assembly 200. For example, an axle may extend through the opening 358. Optionally, the terminal 300 may be rotatable about the axle, such as to shift the relative positions of the upper mating end 304 and the lower mating end 306.

Figure 6:
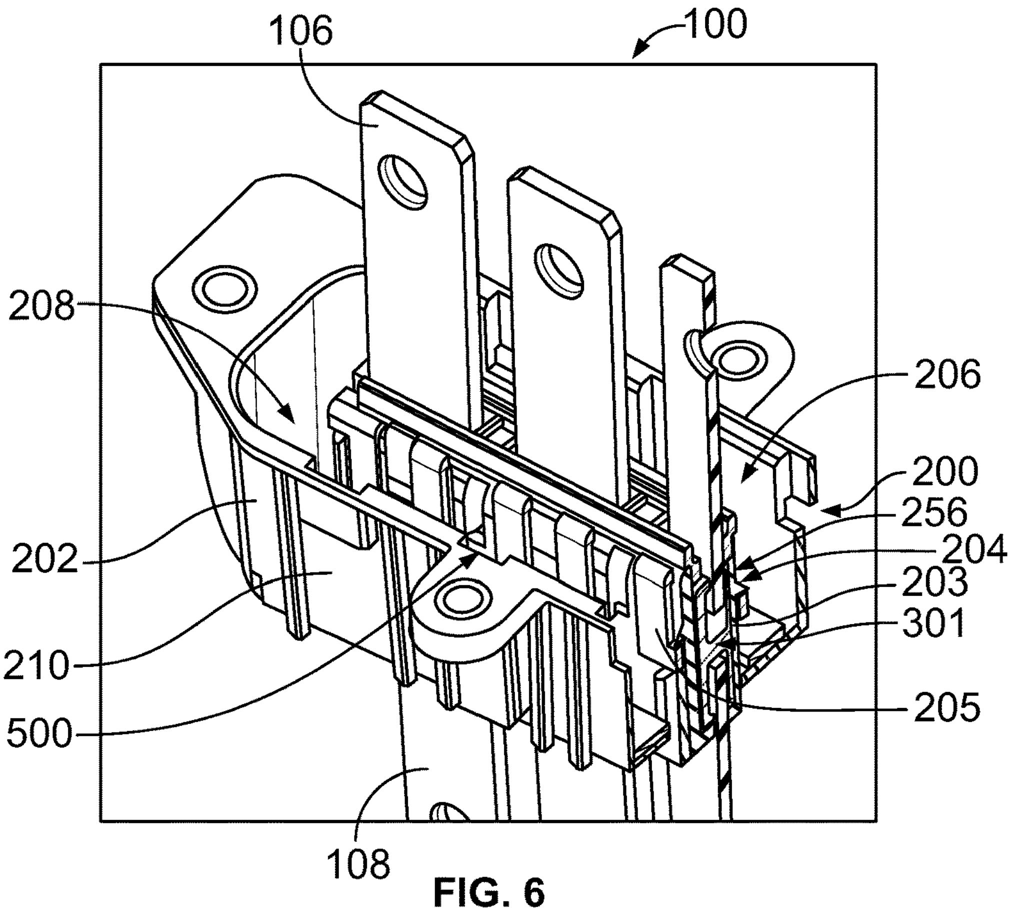
FIG. 6 is a top perspective, partial sectional view of a portion of the header power connector in accordance with an exemplary embodiment.
Figure 7:
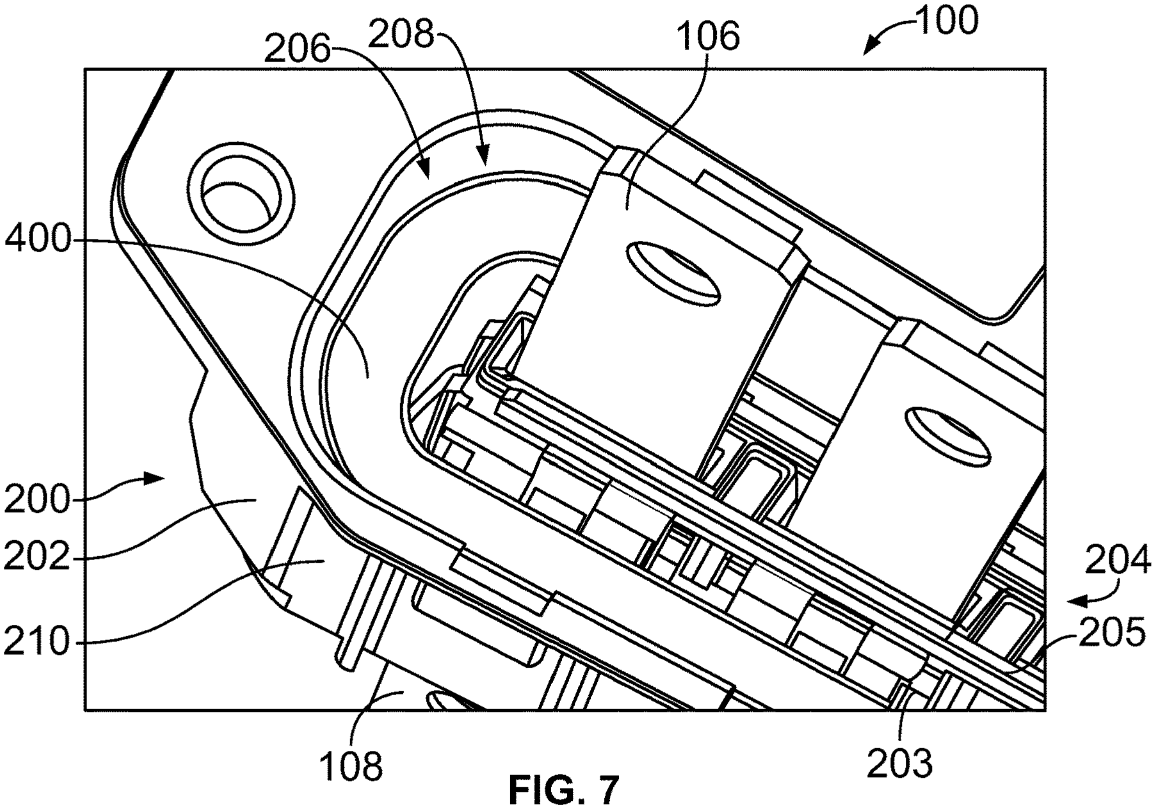
FIG. 7 is a top perspective, partial sectional view of a portion of the header power connector in accordance with an exemplary embodiment.

FIG. 6 is a top perspective, partial sectional view of a portion of the header power connector 100 in accordance with an exemplary embodiment. FIG. 7 is a top perspective, partial sectional view of a portion of the header power connector 100 in accordance with an exemplary embodiment. FIG. 6 shows the header power connector 100 without the choke 400. FIG. 7 shows the header power connector 100 with the choke 400 located in the cavity 206.

During assembly, the terminal assemblies 301 are loaded into the terminal holder 203 of the inner housing 204. The terminal assembly retainer 205 is coupled to the terminal holder 203 to retain the terminal assemblies 301 in the terminal channels 256. The terminal assemblies 301 are configured to be coupled to the busbars 106, 108.

In an exemplary embodiment, the cavity 206 includes a choke pocket 208 defined between the outer wall 210 and the inner housing 204. The choke pocket 208 is configured to receive the choke 400. The choke pocket 208 surrounds the inner housing 204 and the terminal assemblies 301. The choke 400 surrounds the terminal assemblies 301 when received in the choke pocket 208. In various embodiments, the choke pocket 208 may be oversized relative to the choke 400 to allow easy positioning of the choke 400 within the cavity 206. For example, because the choke 400 may have poor manufacturing tolerance, the choke pocket 208 is oversized to ensure that the choke 400 may fit within the choke pocket 208. The extra space or gaps may allow the choke 400 to have freedom of movement relative to the header housing assembly 200. However, the choke positioner(s) 500 are used to limit such freedom of movement of the choke 400 once positioned in the cavity 206. For example, the choke positioner(s) 500 may physically restrain the choke 400 and limit movement (for example, side-to-side and/or front-to-rear and/or top-to-bottom). FIG. 6 illustrates one of the vertical choke positioners 520 in the cavity 206, such as at the bottom of the choke pocket 208. The vertical choke positioner 520 may be compressible to occupy space between the choke 400 and the outer housing 202. The vertical choke positioner 520 may absorb vertical movement of the choke 400 within the cavity 206.

Figure 8:
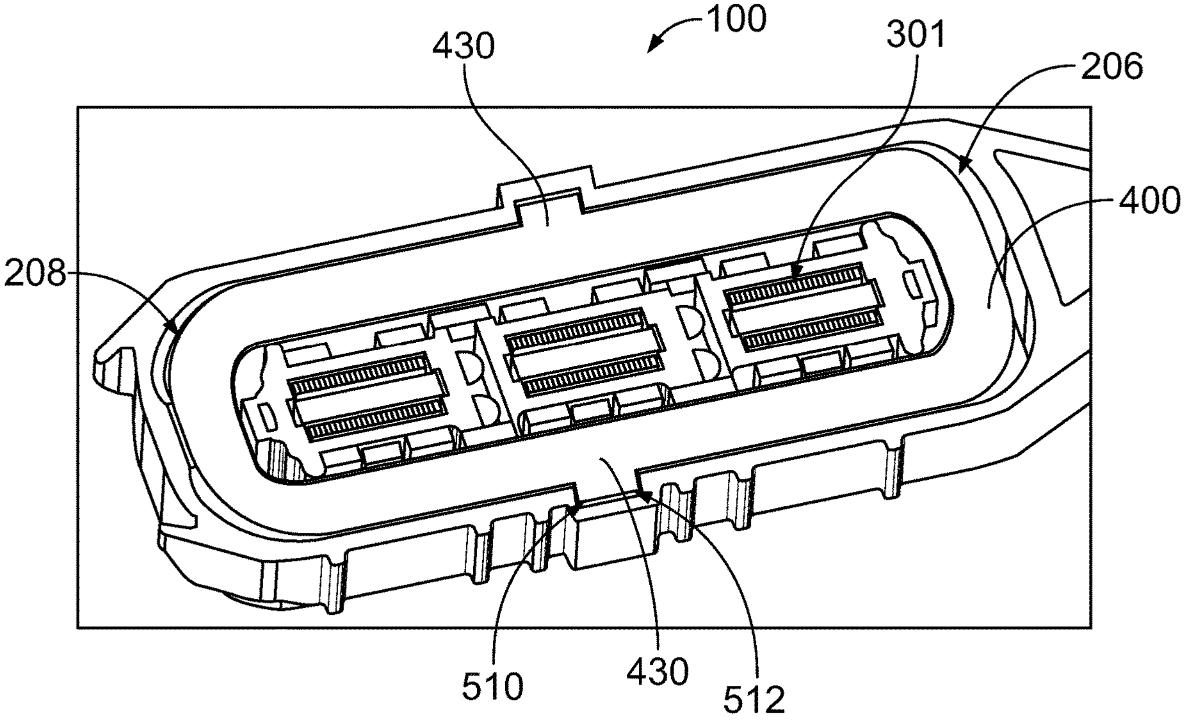
FIG. 8 is a top perspective view of a portion of the header power connector in accordance with an exemplary embodiment.
Figure 9:
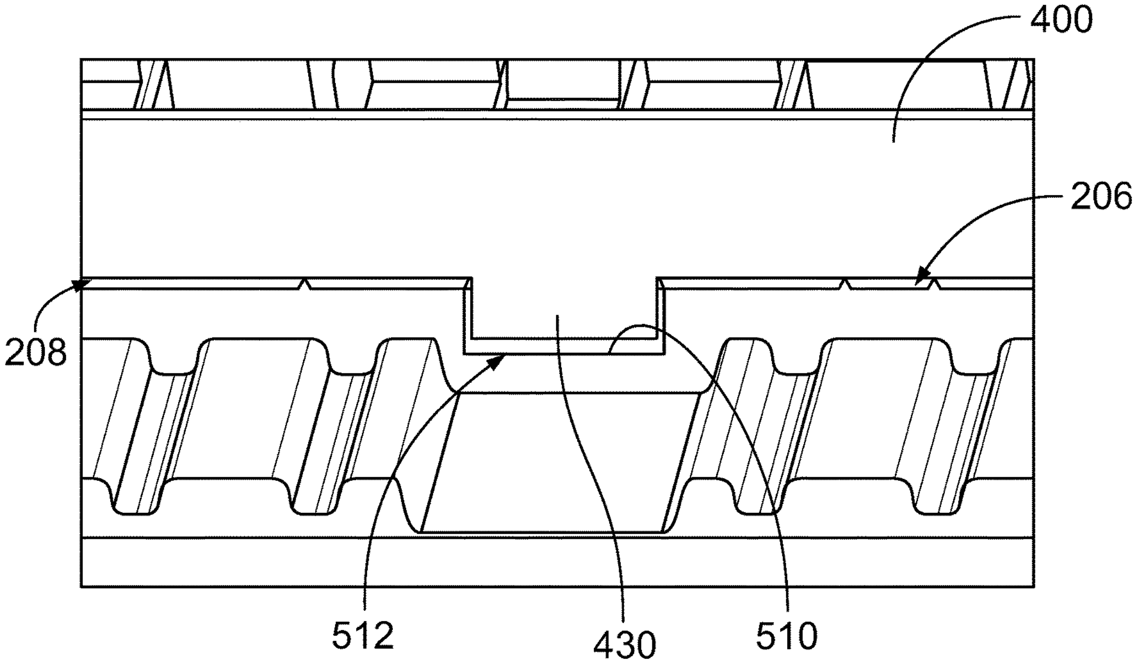
FIG. 9 is a top perspective enlarged view of a portion of the header power connector in accordance with an exemplary embodiment.

FIG. 8 is a top perspective view of a portion of the header power connector 100 in accordance with an exemplary embodiment. FIG. 9 is a top perspective enlarged view of a portion of the header power connector 100 in accordance with an exemplary embodiment. FIGS. 8 and 9 illustrate the header power connector 100 with the choke 400 located in the choke cavity 206. FIGS. 8 and 9 illustrate the choke 400 interfacing with the horizontal choke positioner 510 to position the choke 400 within the choke pocket 208. In the illustrated embodiment, the horizontal choke positioner 510 includes the channels 512 that receive the locating ribs 430. The walls of the channels 512 are used to position the choke 400 relative to the terminal assemblies 301. For example, the channels 512 may center the choke 400 in the choke pocket 208 and the walls of the channels 512 may limit or restrict side-to-side movement of the choke 400 within the choke pocket 208. Optionally, crush ribs or other features may be provided in the channels 512 to tightly hold the locating ribs 430 in the channels 512. Other types of horizontal choke positioners may be used in alternative embodiments.

Figure 10:
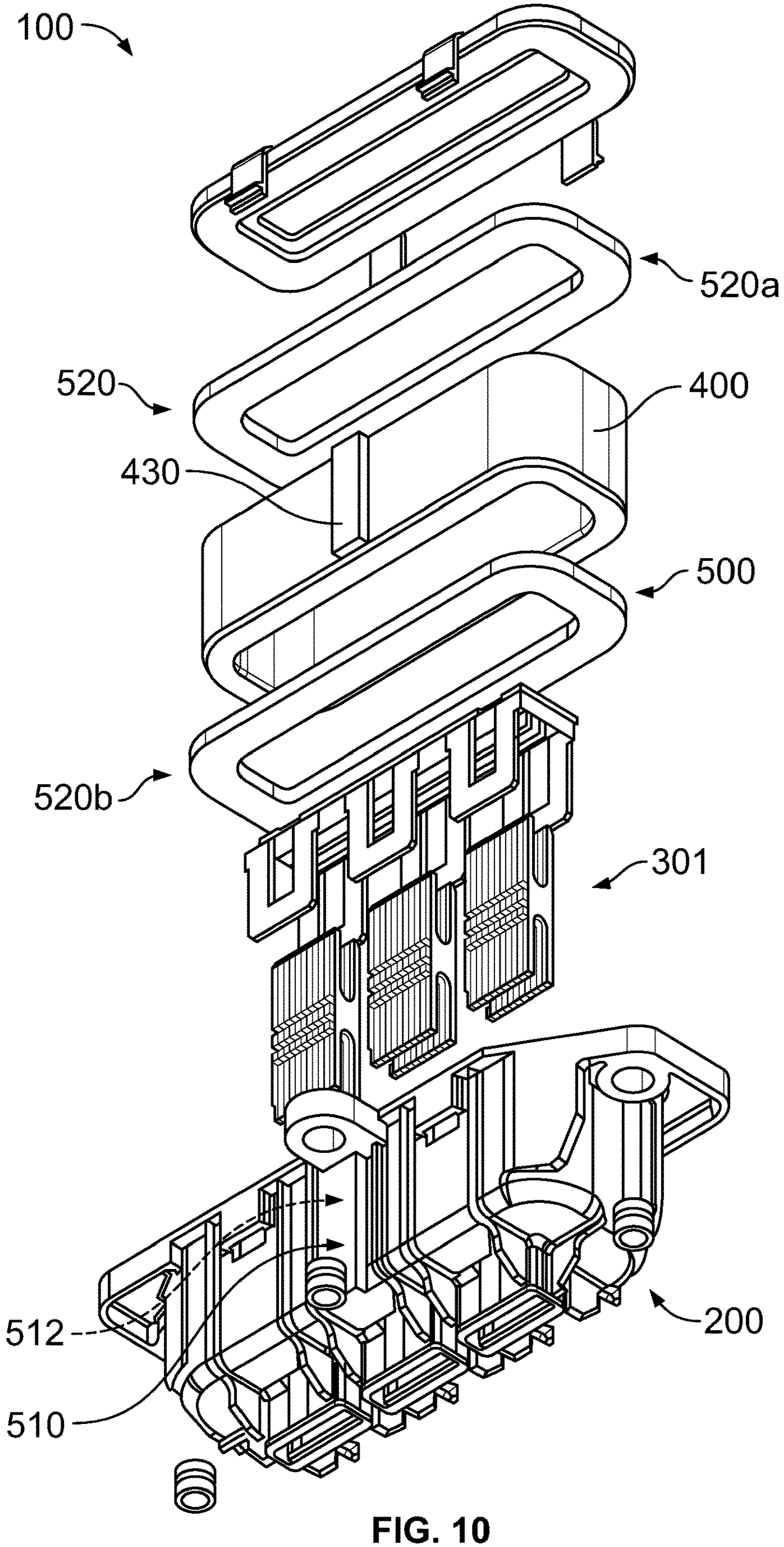
FIG. 10 is an exploded view of the header power connector in accordance with an exemplary embodiment.

FIG. 10 is an exploded view of the header power connector 100 in accordance with an exemplary embodiment. The header power connector 100 includes the header housing assembly 200, a plurality of the terminal assemblies 301 held by the header housing assembly 200, the choke 400 held by the header housing assembly 200, and the choke positioner 500 for positioning the choke 400 in the header housing assembly 200. In the illustrated embodiment, the choke positioner 500 includes a pair of the vertical choke positioners 520, such as upper and lower vertical choke positioners 520*a*, 520*b*. The choke 400 is configured to be sandwiched between the upper and lower vertical choke positioners 520*a*, 520*b*. The vertical choke positioners 520*a*, 520*b* are compressible and are configured to absorb vertical movements of the choke 400 within the header housing assembly 200, such as from vibrations. The horizontal choke positioners 510 are illustrated as channels 512 that receive the locating ribs 430 of the choke 400. Other types of horizontal choke positioners may be used in alternative embodiments.

Figure 11:
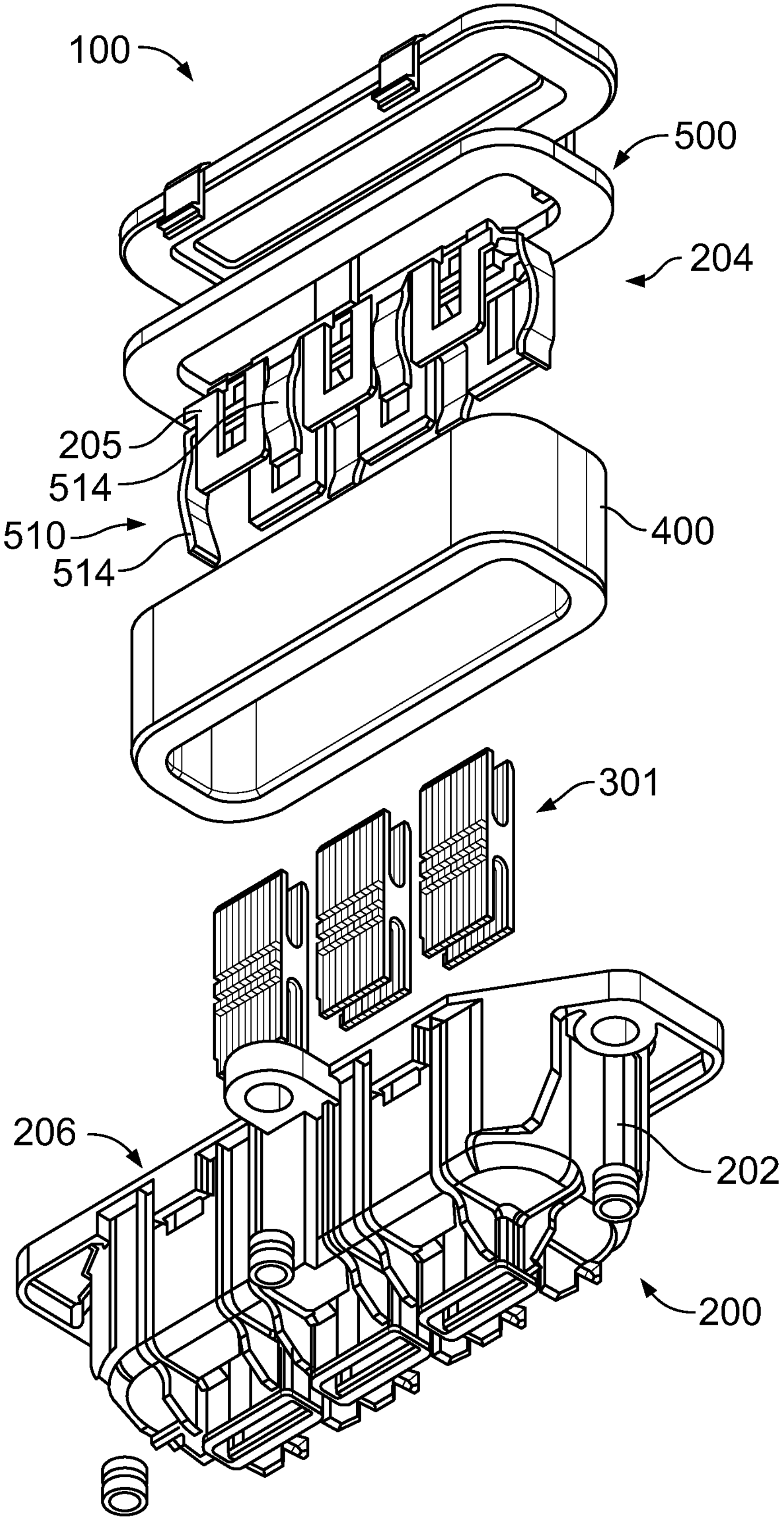
FIG. 11 is an exploded view of the header power connector in accordance with an exemplary embodiment.

FIG. 11 is an exploded view of the header power connector 100 in accordance with an exemplary embodiment. FIG. 11 illustrates a different type of choke positioner 500. For example, the choke 400 does not include the locating ribs 430 and the outer housing 202 does not include the channels. Rather, in the illustrated embodiment, the horizontal choke positioners 510 include spring beams 514 extending from the inner housing 204, such as from the terminal assembly retainer 205. The horizontal choke positioners 510 (for example, spring beams 514) interface with the choke 400 to position the choke 400 relative to the header housing assembly 200 and the terminal assemblies 301. The spring beams 514 are used to center the choke 400 within the cavity 206 of the outer housing 202. The spring beams 514 are flexible. The spring beams 514 are used to absorb movement of the choke 400, such as due to vibration. For example, the spring beams 514 restrict movement in a horizontal direction (for example, side-to-side and/or front-to-rear), which reduces risk of damage to the components of the header power connector 100.

Figure 12:
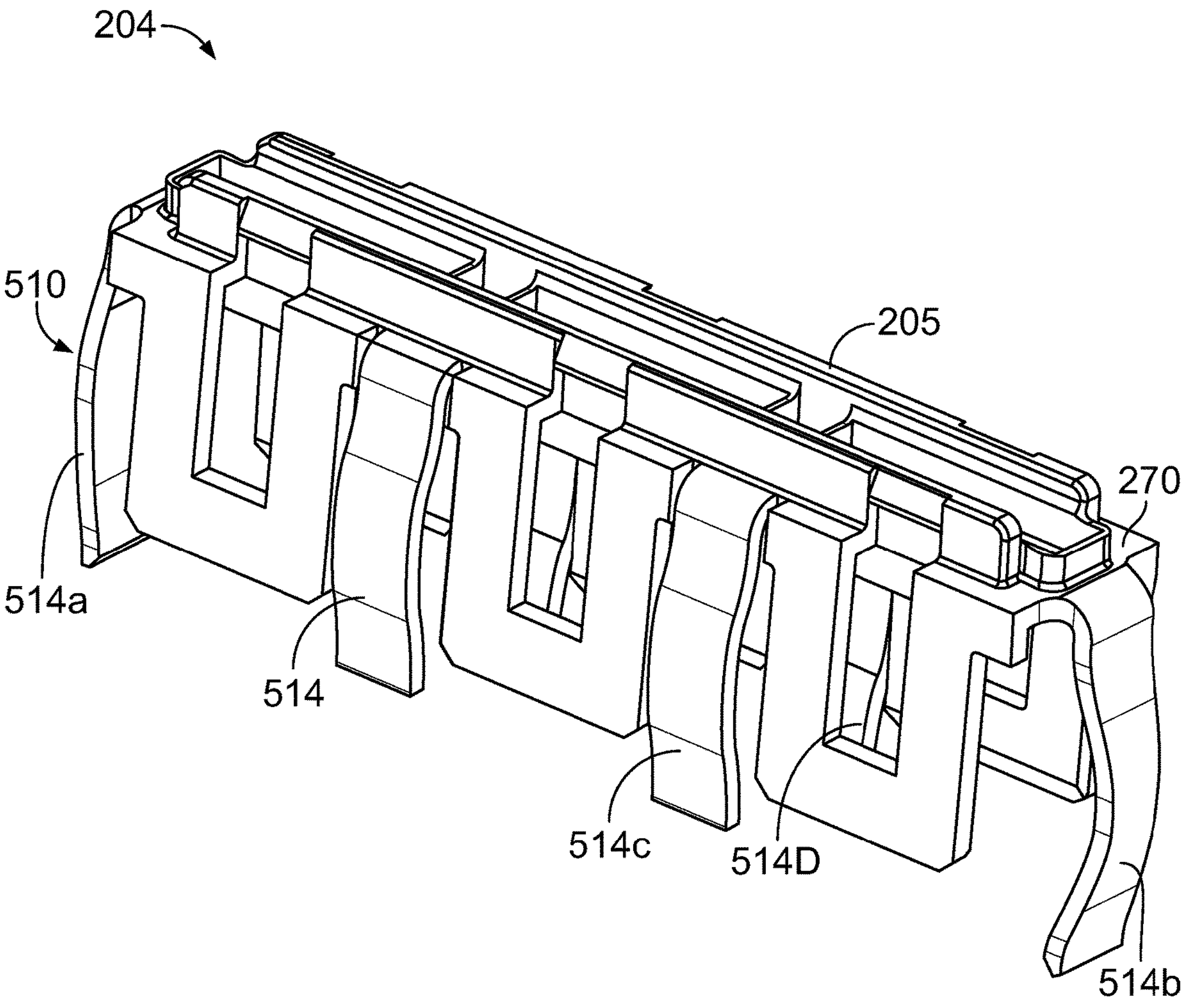
FIG. 12 is a perspective view of a portion of the inner housing showing the terminal assembly retainer in accordance with an exemplary embodiment.

FIG. 12 is a perspective view of a portion of the inner housing 204 showing the terminal assembly retainer 205 in accordance with an exemplary embodiment. The terminal assembly retainer 205 includes the spring beams 514, which define the horizontal choke positioners 510. The spring beams 514 extend from the end wall 270. The spring beams 514 have interfaces configured to engage the choke body 402 in the opening 404 of the choke 400. The spring beams 514 are flexible to absorb movement of the choke 400 relative to the inner housing 204 and the terminal assemblies 301.

In the illustrated embodiment, the spring beams 514 extend along the front and the rear of the terminal assembly retainer 205 to absorb front-to-rear movement of the choke 400 relative to the terminal assembly retainer 205. In an exemplary embodiment, the spring beams 514 are provided at both ends of the terminal assembly retainer 205 to absorb side-to-side movement of the choke 400 relative to the terminal assembly retainer 205. In an exemplary embodiment, the spring beams 514 include at least one first spring beam 514*a* at a first side of the terminal assembly retainer 205, at least one second spring beam 514*b* at a second side of the terminal assembly retainer 205, at least one front spring beam 514*c* at a front of the terminal assembly retainer 205, and at least one rear spring beam 514*d* at a rear of the terminal assembly retainer 205. The first and second spring beams 514*a*, 514*b* control side-to-side positioning of the choke 400 relative to the terminal assembly retainer 205. The front and rear spring beams 514*c*, 514*d* control front-to-rear positioning of the choke 400 relative to the terminal assembly retainer 205.

The spring beams 514 are curved in the illustrated embodiment and may be elastically deformed (for example, flattened) when engaging the choke 400. The spring beams 514 are configured to press outward against the choke 400 to position (for example, center or return to a nominal position) the choke 400 relative to the terminal assembly retainer 205.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A header power connector comprising:

a header housing assembly including an outer housing having an outer wall forming a cavity, the outer housing extending between a top and a bottom, the outer housing configured to receive an upper busbar in the cavity through the top, the outer housing configured to receive a lower busbar in the cavity through the bottom, the header housing assembly including an inner housing received in the cavity, the inner housing including a terminal channel;

a terminal assembly held in the terminal channel of the inner housing, the terminal assembly received in the cavity, the terminal assembly including a plurality of terminals arranged in a terminal stack, each terminal including an upper mating end having an upper socket configured to receive the upper busbar and a lower mating end having a lower socket configured to receive the lower busbar, the terminals configured to electrically connect the upper and lower busbars;

a choke received in the cavity, the choke having a check choke body surrounding the terminal assembly, the choke body having an opening therethrough receiving the terminal assembly; and a choke positioner in the cavity, the choke positioner interfacing with the choke to position the choke relative to the outer housing.

2. The header power connector of claim 1, wherein the choke is loaded into the cavity in a loading direction, the choke positioner positioning the choke in a lateral direction perpendicular to the loading direction.

3. The header power connector of claim 1, wherein the choke includes a first side and a second side extending between a top and a bottom of the choke, the choke positioner holding a side-to-side positioning of the choke relative to the outer housing.

4. The header power connector of claim 3, wherein the choke includes a front and a rear extending between the first side and the second side, the choke positioner holding a front-to-rear position of the choke relative to the outer housing.

5. The header power connector of claim 1, wherein the choke positioner is coupled to a top of the choke to vertically position the choke within the cavity.

6. The header power connector of claim 1, wherein the choke positioner is compressible between the choke and the header housing assembly.

7. The header power connector of claim 1, wherein the outer housing includes a channel along an inner surface of the outer wall open to the cavity defining the horizontal choke positioner, the choke including a locating rib received in the channel to position the choke relative to the outer wall.

8. The header power connector of claim 1, wherein the inner housing includes spring beams defining the choke positioner, the spring beams having interfaces engaging the choke body in the opening, the spring beams being flexible to absorb movement of the choke relative to the inner housing and the terminal assembly.

9. The header power connector of claim 8, wherein the spring beams include a first spring beam at a first side of the inner housing, a second spring beam at a second side of the inner housing, a front spring beam at a front of the inner housing, and a rear spring beam at a rear of the inner housing, the first and second spring beams controlling side-to-side positioning of the choke relative to the inner housing, the front and rear spring beams controlling front-to-rear positioning of the choke relative to the inner housing.

10. The header power connector of claim 1, wherein the choke includes a top and a bottom, the choke positioner comprising an upper choke positioner coupled to the top and a lower choke positioner coupled to the bottom, the upper and lower choke positioners being compressible to absorb movement of the choke relative to the outer housing.

11. The header power connector of claim 1, wherein the choke includes a top, a bottom, and a side wall between the top and the bottom, the choke positioner comprising a lateral choke positioner coupled to the side wall, the lateral choke positioner being compressible to absorb lateral movement of the choke relative to the outer housing.

12. The header power connector of claim 1, wherein the choke includes a top, a bottom, and a side wall between the top and the bottom, the choke including a protrusion extending along the side wall, the choke positioner including a channel formed in the outer wall receiving the protrusion to restrict movement of the choke relative to the outer housing.

13. A header power connector comprising:

a header housing assembly including an outer housing having an outer wall forming a cavity, the outer housing extending between a top and a bottom, the outer housing having a first side and a second side, the outer housing having a front and a rear, the outer housing configured to receive an upper busbar in the cavity through the top, the outer housing configured to receive a lower busbar in the cavity through the bottom, the header housing assembly including an inner housing received in the cavity, the inner housing including a terminal channel;

a terminal assembly held in the terminal channel of the inner housing, the terminal assembly received in the cavity, the terminal assembly including a plurality of terminals arranged in a terminal stack, each terminal including an upper mating end having an upper socket configured to receive the upper busbar and a lower mating end having a lower socket configured to receive the lower busbar, the terminals configured to electrically connect the upper and lower busbars;

a choke received in the cavity, the choke having a chock body surrounding the terminal assembly, the choke body having an opening therethrough receiving the terminal assembly; and a horizontal choke positioner in the cavity, the choke positioner interfacing with the choke to horizontally position the choke relative to the outer housing between the first side and the second side;

a vertical choke positioner in the cavity, the choke positioner interfacing with the choke to vertically position the choke relative to the outer housing between the top and the bottom.

14. The header power connector of claim 13, wherein the choke is loaded into the cavity in a loading direction, the horizontal choke positioner positioning the choke in a lateral direction perpendicular to the loading direction, the vertical choke positioner positioning the choke in a vertical direction parallel to the loading direction.

15. The header power connector of claim 13, wherein the choke includes a first side and a second side extending between a top and a bottom of the choke, the horizontal choke positioner holding a side-to-side positioning of the choke relative to the outer housing.

16. The header power connector of claim 13, wherein the vertical choke positioner is coupled to a top of the choke to vertically position the choke within the cavity.

17. The header power connector of claim 13, wherein the vertical choke positioner is compressible between the choke and the header housing assembly.

18. The header power connector of claim 13, wherein the outer housing includes a channel along an inner surface of the outer wall open to the cavity defining the horizontal choke positioner, the choke including a locating rib received in the channel to position the choke relative to the outer wall.

19. The header power connector of claim 13, wherein the horizontal choke positioner includes spring beams having interfaces engaging the choke body in the opening, the spring beams being flexible to absorb movement of the choke relative to the inner housing and the terminal assembly.

20. A power connector system comprising:

an upper busbar for powering a first electrical component, the upper busbar having an upper busbar edge;

a lower busbar for powering a second electrical component, the lower busbar having a lower busbar edge; and a header power connector for electrically connecting the upper busbar with the lower busbar to transfer power between the first and second electrical components, the header power connector comprising:

a header housing assembly including an outer housing having an outer wall forming a cavity, the outer housing extending between a top and a bottom, the outer housing receiving the upper busbar in the cavity through the top, the outer housing receiving the lower busbar in the cavity through the bottom, the header housing assembly including an inner housing received in the cavity, the inner housing including a terminal channel;

a terminal assembly held in the terminal channel of the inner housing, the terminal assembly received in the cavity, the terminal assembly including a plurality of terminals arranged in a terminal stack, each terminal including an upper mating end having an upper socket configured to receive the upper busbar and a lower mating end having a lower socket configured to receive the lower busbar, the terminals configured to electrically connect the upper and lower busbars;

a choke received in the cavity, the choke having a chock body surrounding the terminal assembly, the choke body having an opening therethrough receiving the terminal assembly; and a choke positioner in the cavity, the choke positioner interfacing with the choke to position the choke relative to the outer housing.

* * * * *